United States Patent [19]

Meisner

[11] Patent Number: 4,601,589
[45] Date of Patent: Jul. 22, 1986

[54] ELECTRICAL POCKET THERMOMETER WITH DIGITAL DISPLAY

[75] Inventor: Alfred Meisner, Nuremberg, Fed. Rep. of Germany

[73] Assignee: Fa. Diehl GmbH & Co., Nuremberg, Fed. Rep. of Germany

[21] Appl. No.: 736,330

[22] Filed: May 21, 1985

[30] Foreign Application Priority Data

Jun. 8, 1984 [DE] Fed. Rep. of Germany ... 8417518[U]

[51] Int. Cl.$^4$ .................... G01K 1/08; H01L 31/04
[52] U.S. Cl. ...................... 374/208; 136/291; 340/811; 340/815.2; 374/163
[58] Field of Search .............. 374/208, 163; 73/431; 136/291; 340/600

[56] References Cited

U.S. PATENT DOCUMENTS

| | | | |
|---|---|---|---|
| 3,857,285 | 12/1974 | Athey et al. | 73/431 X |
| 3,878,964 | 4/1975 | Fogle | 73/431 X |
| 3,895,296 | 7/1975 | Boyd et al. | 73/431 X |
| 4,095,467 | 6/1978 | McGlynn | 374/185 |
| 4,201,090 | 5/1980 | Davidson | 73/431 |
| 4,209,735 | 6/1980 | Yoshidas | 320/2 |
| 4,317,367 | 3/1982 | Schonberger | 374/185 X |
| 4,369,498 | 1/1983 | Schulte | 374/208 UX |
| 4,539,516 | 9/1985 | Thompson | 374/208 UX |

Primary Examiner—Daniel M. Yasich
Attorney, Agent, or Firm—Collard, Roe & Galgano

[57] ABSTRACT

An electrical thermometer having a digital display comprises a flat, rectangular casing a principal face of which is provided with the digital indicating device, and a measuring probe which is connected with a voltage-fed electrical building block of an electronic analyzer and display unit. The thermometer is devised to be smaller and more compact than known devices and affords a safe operation even under disadvantageous environmental conditions. To this end, the voltage source of the electronic analyzer and display unit block is a solar cell arranged in a principal face of the casing. The presence of this solar cell affords a particularly advantageous permanent guarantee of the energy supply. Moreover, it offers the advantage of a construction of the thermometer casing which is free from the need for a receptacle opening for a battery and can thus be manufactured water-tight in a simple manner.

9 Claims, 3 Drawing Figures

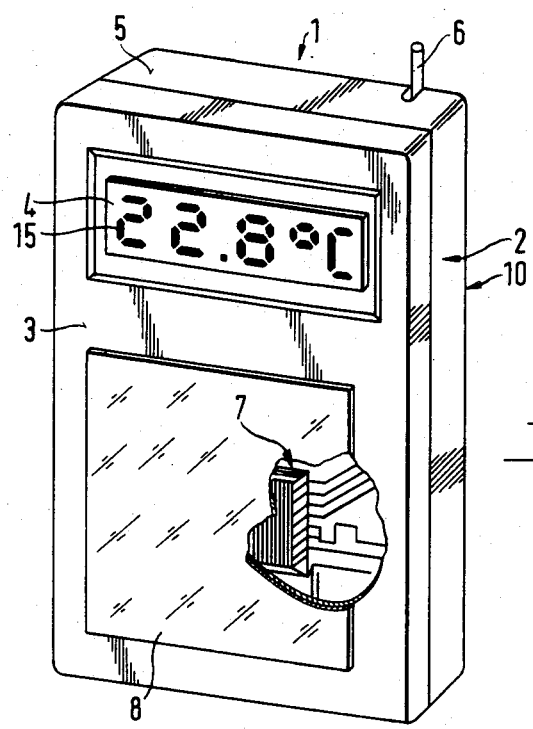
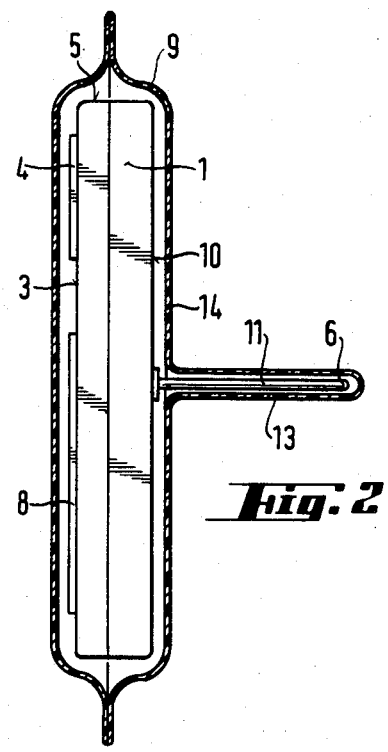
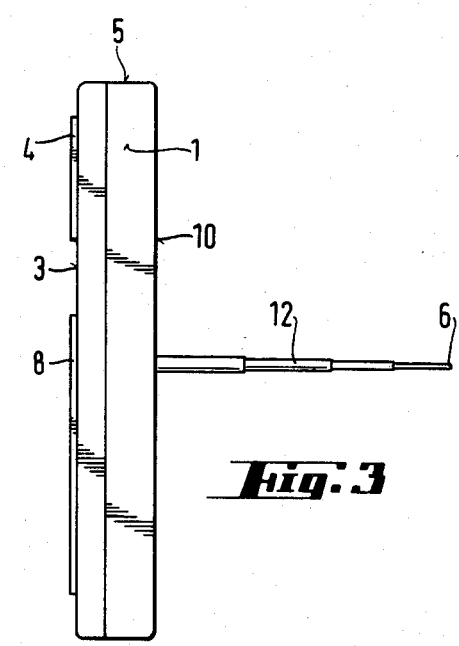

ELECTRICAL POCKET THERMOMETER WITH DIGITAL DISPLAY

BACKGROUND OF THE INVENTION

This invention relates to an electrical pocket thermometer with digital display, having a flat, rectangular casing, one of the large faces of which is provided with the digital display, and a measuring sensor (primary element) being arranged on one of the casing faces and being connected with a voltage-fed electrical block of electronic analyzer and display means.

A known thermometer of the above-described type comprises a flat, rectangular casing on the frontal face of which there is arranged a digital display unit in the shape of a numerical LCD display. From the rear side of the thermometer casing there emerges a connecting lead at the end of which there is provided a temperature measuring probe. The connecting lead can be pressed, in the approximate shape of a spiral, into an inlay groove in the rear face of the casing, so that the measuring probe, which is attached to the lead end, will protrude with its probe tip from the casing rear wall.

A battery shelf being closable by means of a flap is also arranged on the casing rear side, for receiving a voltage source for feeding current to the electronic analyzer and display block in the interior of the casing.

The range of application of this known thermometer is limited because of the opening in the casing for receiving the battery as well as of the presence of a battery in general.

OBJECTS AND SUMMARY OF THE INVENTION

It is an object of the invention to provide a pocket thermometer of the above-described type which can be built smaller and more compact, and will permit a safe operation even under adverse environmental conditions.

This object and others that will become apparent from the following description of the invention, are attained, in accordance therewith, in an electrical pocket thermometer of the initially described type in which the voltage source of the block of electronic analyzer and display means is a solar cell arranged in a principal face of the thermometer casing.

Indeed it is known to operate electronic pocket devices of the most variegated kinds, such as pocket watches or pocket computers, with a solar cell arranged in a wall of their casing. Such devices are usually held in hand when being used and are usually not subject to particularly severe environmental conditions. However, the novel arrangement of a solar cell in a principal face, and preferably the frontal face of the thermometer casing which face also bears the display means, offers the advantage of ensuring a lasting provision of the supply of electrical energy to the electronically operating pocket thermometer, even at the very low temperatures encountered in deep freezing equipment. If a conventional electronically operated pocket thermometer is placed in a high performance deep freeze chest, the voltage supply of a conventional battery will break down and the thermometer will thereby become inoperative.

Solar cells, however, work the better, the lower the ambient temperature. Moreover, the solar cell-equipped thermometer according to the invention offers the advantage that its casing can be built without a particular opening and recess for installing a battery therein. On the contrary the casing can be built, without problem, to be water-tight as well as safe from the danger of icing, thereby guaranteeing a long life of the thermometer, even when used in a freezer.

The novel thermometer according to the invention can also be used for controlling the temperature of a swimming pool, or in a laboratory, for the temperature control of chemical baths, not to be thought of in the past. When the casing is sealed in hermetically in a chemically resistant coating which must, of course, be transparent at least in the area covering the display and the light-receiving face of the solar cell, then the thermometer can be placed without problems into the medium to be measured, without danger of, for instance, penetrating humidity detrimentally affecting electrical components of the device. The novel use of a solar cell in a pocket thermometer also offers the advantage of a substantial reduction of the volume of the casing so that, with a maximum degree of integration of the electrical components, it will be possible to give the whole device the size of a credit card.

Thus, the casing can be blistered in a water-tight transparent foil or can be formed as a whole as a tight, in particular water-tight, welded-in, cast-in or permanently glued-in block casing, thus completely insulating the casing. These advantageous features are only attainable in combination with the novel use of a solar cell as the voltage source for the thermometer which permits dispensing completely with the need for a battery recess and openings for the introduction of electrical contactor means leading thereto. When the device is to be used in liquid containers of relatively high liquid level, such as swimming pools, then it is advantageous to provide the thermometer with a floating body or to design it as part of the same. Thus, the thermometer according to the invention can be mounted in or on an air-filled, inflatable floating body, in particular having the shape of a toy animal or a ball, at a location thereon where the display can be read in an easy, convenient manner.

Thus, it is preferred in this and similar cases that the temperature-measuring probe or sensor (primary element) be rod-shaped and protrudes from the underside of the casing. This is of particular advantage when the thermometer is used in a swimming pool, as the temperature will then not be measured directly at the water surface but at a depth of, e.g. about 5 to 10 cm below the surface. A thermometer having this feature is moreover suitable for measuring the temperature in the interior of deformable materials, and can be used, for example, as a snow thermometer in the difficult determination of a ski wax the suitability of which depends on the temperature of the snow. An adaptation of the thermometer to measuring temperatures at different depths is made possible by the preferred feature of a measuring probe or sensor which can be extended or shortened due to a telescope-type structure. In this connection it should be noted that in particular a combination of the hermetically sealed thermometer casing and the rod-shaped probe protruding from the rear wall thereof will permit the successful measuring of the temperature prevailing in the interior of snow or of a liquid. A conventional thermometer casing provided with a battery chamber would lack tightness and, therefore, be susceptible to breakdown.

When the digital display is devised as an alphanumerical display unit and is thus suitable for displaying also messages in word representation, then the thermometer according to the invention can be adapted for particularly specialized uses, such as, for instance, as a ski wax thermometer which indicates the correct wax to be used by stating a particular color, e.g., blue, green, silver, red and the like.

Further objects and advantages will become apparent from the following detailed description of a preferred embodiment of the thermometer according to the invention in connection with the illustration thereof, by way of example, in the following drawing in which FIG. 1 shows a perspective view of the illustrated embodiment of the novel thermometer looking toward its frontal face;

FIG. 2 shows schematically a lateral view of a similar embodiment of the thermometer according to the invention; and FIG. 3 shows schematically in a lateral view another similar embodiment thereof.

DETAILED DESCRIPTION OF THE EMBODIMENTS SHOWN IN THE DRAWING

The thermometer 1 is a digital display pocket thermometer comprising a flat, rectangular casing 2 of insulating material which bears on its frontal face 3 a digital indicating device 4 in the form of an LCD display for representing the electronically determined temperature value. In one of the sidewalls of the casing 2, namely at its top wall 5, there is mounted a measuring probe 6 which is associated in a conventional manner (not shown) with a voltage-fed electronic analyzer and display building block 7 arranged in the casing 2.

As a voltage source there is mounted in the frontal wall 3 of the casing 2 a solar cell 8 which preferably occupies about 70 to 80% of the frontal face of the casing not being occupied by the indicating device 4.

As shown in FIG. 3 the casing of the embodiment shown in FIG. 1 can be rendered tight, and in particular water-tight, by having it glued together as shown in FIG. 1 and cast in a transparent envelope free from partial gaps. In the embodiment shown in FIG. 2, the thermometer is completely enveloped by welding it into a transparent blister, thus rendering it likewise water- and dust-tight. In all illustrated embodiments, it is essential that recesses in the casing such as battery chambers and the like can be dispensed with which would have to be opened from time to time in order to exchange the batteries. This permits manufacture of the casing as an integral piece of truly sealed structure.

In the embodiment shown in FIG. 1, the measuring probe 6 is connected with the casing by means of an external connecting cord (not shown) and this cord as well as the probe 6 can be clamped in grooves provided in the casing rear wall 10. In the embodiments of the casing shown in FIGS. 2 and 3, the probe 6 protrudes approximately at a right angle from the casing rear wall 10 and is arranged at the end of a rod-shaped carrier 11 or 12, respectively, with the carrier 12 shown in FIG. 3 being adapted for telescoping to change its length. In connection with the carrier 11 or 12, the probe 6 thus serves, on the one hand, for measuring temperature at deeper levels in the interior of a medium to be measured, but, on the other hand, it may serve as a foot member for placing the thermometer on a shelf, with the solar cell advantageously in an inclined plane, facing obliquely upwardly under an angle most favorable for receiving incident light.

In the embodiment illustrated in FIG. 2, the carrier 11 together with the measuring probe 6 is lodged in an elongated pocket 13 of the backside 14 of a transparent blister 9, in order to guarantee a tight construction of the entire device. It can also be suitable for certain purposes, when the indicating device 4 is devised, on the basis of a somewhat modified arrangement 15 of the indicating segments, as an alpha-numerical display for the representation of numbers as well as words having certain connotations.

I claim:

1. An electrical pocket thermometer with digital display, comprising a flat, rectangular casing having two large faces, said faces including a front face and a rear wall opposite said front face, said digital display being arranged on said large front face, a rod-shaped measuring sensor or probe being supported by a telescopable carrier protruding from said rear wall, a voltage-fed block of electronic analyzer and display means being electrically connected with said block, and a voltage source connected with said block for feeding voltage thereto, said voltage source being a solar cell arranged in one of said large faces of said casing.

2. The pocket thermometer of claim 1, wherein said solar cell is arranged on the frontal face of said casing, which face bears said digital display.

3. The pocket thermometer of claim 1, further comprising a water-tight transparent blister in which said casing is welded in.

4. The pocket thermometer of claim 1, wherein said casing is a water-tight welded-together block casing.

5. The pocket thermometer of claim 1, wherein said casing is a water-tight cast-in block casing.

6. The pocket thermometer of claim 1, wherein said casing is a water-tight permanently glued-together block casing.

7. The pocket thermometer of claim 1, wherein said casing comprises a floating body integral therewith.

8. The pocket thermometer of claim 1, further comprising a float body adapted for being supportingly attached to said casing.

9. The pocket thermometer of claim 1, wherein said digital display comprises an alpha-numerical segment arrangement.

* * * * *